United States Patent
Kim et al.

(10) Patent No.: US 9,066,254 B2
(45) Date of Patent: Jun. 23, 2015

(54) MOBILE STATION, BASE STATION, AND RELAY STATION FOR A WIRELESS ACCESS SYSTEM

(75) Inventors: Eunkyung Kim, Daejeon (KR); Sung Cheol Chang, Daejeon (KR); Sung Kyung Kim, Daejeon (KR); Hyun Lee, Daejeon (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 138 days.

(21) Appl. No.: 13/882,331

(22) PCT Filed: Oct. 28, 2011

(86) PCT No.: PCT/KR2011/008156
§ 371 (c)(1),
(2), (4) Date: Apr. 29, 2013

(87) PCT Pub. No.: WO2012/057576
PCT Pub. Date: May 3, 2012

(65) Prior Publication Data
US 2013/0208584 A1 Aug. 15, 2013

(30) Foreign Application Priority Data

Oct. 28, 2010 (KR) .................. 10-2010-0105866
Oct. 28, 2011 (KR) .................. 10-2011-0111095

(51) Int. Cl.
*H04W 4/00* (2009.01)
*H04L 12/28* (2006.01)
*H04L 12/54* (2013.01)
*H04W 24/04* (2009.01)
*H04W 72/00* (2009.01)
*H04W 88/04* (2009.01)
*H04W 88/06* (2009.01)
*H04W 76/00* (2009.01)
*H04W 76/02* (2009.01)

(52) U.S. Cl.
CPC ............ *H04W 24/04* (2013.01); *H04W 72/005* (2013.01); *H04W 88/04* (2013.01); *H04W 88/06* (2013.01); *H04W 76/002* (2013.01); *H04W 76/022* (2013.01); *H04W 76/023* (2013.01)

(58) Field of Classification Search
CPC ..... H04W 80/04; H04W 88/06; H04W 28/04; H04W 72/04; H04L 45/00; H04L 47/10; H04L 45/16; H04L 12/185
USPC .................................. 370/328, 329, 389, 390
See application file for complete search history.

(56) References Cited

FOREIGN PATENT DOCUMENTS

WO       2012/057576 A2    5/2012

OTHER PUBLICATIONS

Kim, Kyungkyu et al., "Clarifications to Working Draft for 802.16n SRD," IEEE C802.16gman-10/0031, 2 pages (2010).

(Continued)

*Primary Examiner* — Ronald B Abelson
(74) *Attorney, Agent, or Firm* — H.C. Park & Associates, PLC (57) ABSTRACT

Protocol structure of a mobile station, base station or relay station in a wireless access system is provided. The protocol structure includes a first function block configured to perform radio resource control and management as a MAC layer and to reside on a control plane, and a second function block configured to perform medium access control as the MAC layer and to reside on the control plane and a data plane. The first function block includes various function blocks for supporting high reliability.

16 Claims, 10 Drawing Sheets

(56) References Cited

OTHER PUBLICATIONS

Kim, Kyungkyu et al., "Text proposal of 802.16n System Requirements Document (Section 6.2)," IEEE C802.16gman-10/0023, 6 pages, (2010).

Lee, Anseok et al., "Text proposal to 802.16n System Requirement Document (Section 6.1)," IEEE C802.16gman-10/0027, 6 pages, (2010).

Zeira, Eldad et al., "Proposed terminology for 802.16n SRD," IEEE 802.16 Presentation Submission Template (Rev. 9), IEEE 802.16gman-10/0030, 5 pages, (2010).

International Search Report and Written Opinion for Application No. PCT/KR2011/008156, 9 pages, dated Jun. 22, 2012.

----- Control Plane
——— Bearer Plane

----- Control Plane
——— Bearer Plane

“MOBILE STATION, BASE STATION, AND RELAY STATION FOR A WIRELESS ACCESS SYSTEM

RELATED APPLICATIONS

This application is a 35 U.S.C. §371 filing of International Application Number PCT/KR2011/008156 which was filed on Oct. 28, 2011, and which claims priority to, and the benefit of, Korean Application Nos. 10-2010-0105866, filed on Oct. 28, 2010, and 10-2011-0111095 filed Oct. 28, 2011.

The contents of the aforementioned applications are hereby incorporated herein by reference.

TECHNICAL FIELD

The present invention relates to a mobile station, a base station, and a relay station of a wireless access system.

BACKGROUND ART

Recently, a wireless access system that supports high reliability (HR) compared with a conventional wireless access system is developed. IEEE standard 802.16n that is an amendment to IEEE standard 802.16 and IEEE standard 802.16m is developed as one example of this wireless access system.

For the high reliability, the wireless access system is required to support multi-mode operation where a base station, mobile station or relay station performs a role of the other station, single point of failure (SPOF) immunity for maintaining a communication on the failure of radio link, a direct communication between mobile stations, and a multicast communication. However, a wireless access system for meeting these requirements has not been defined.

DISCLOSURE

Technical Problem

An aspect of the present invention provides a mobile station, a base station and a relay station of a wireless access system capable of providing high reliability.

Technical Solution

According to an embodiment of the present invention, a mobile station of a wireless access system is provided. The mobile station includes a first function block configured to perform radio resource control and management as a medium access control (MAC) layer and to reside on a control plane, and a second function block configured to perform medium access control as the MAC layer and to reside on the control plane and a data plane. The first function block includes a direct communication management block configured to support a direct communication between the mobile station and other mobile station, a multi-mode management block configured to control the mobile station to perform a role of a relay station or a base station, a multicast management block configured to perform a group communication through a multicast group including the mobile station, and a path management block configured to manage a path for the direct communication.

The direct communication management block may includes a direct communication control management block configured to control a frame to manage direct communication traffic transmission between the mobile station and the other mobile station, a direct communication data transmission block configured to perform transmission of the direct communication traffic, and a direct communication data forwarding block configured to forward data to a station that does not perform the direct communication, during the direct communication.

The multi-mode management block may includes a multi-mode configuration and control management block configured to perform configuration and control for a role of the mobile station, a connection maintenance management block configured to maintain or change a current service, and a link measurement and report management block configured to measure radio link quality of the mobile station and to report the radio link quality to other station.

The multicast management block may includes a multicast group configuration management block configured to manage establishment, change or delete of a multicast communication in the multicast group, a multicast session management block configured to manage registration or deregistration of a multicast service, or start, change or termination of a multicast session, and a multicast key management block configured to manage a multicast key for reliable multicast transmission.

The path management block may includes a path configuration management block configured to manage configuration for performing a path discovery, a path establishment, a path selection, a path maintenance, or a path recovery, a path control management block configured to perform a function for controlling a path, a path discovery management block configured to perform a neighbor discovery or a path discovery, a path maintenance management block configured to manage path establishment, path delete, or path re-establishment, and a path selection management block configured to set an optimum path from among a plurality of valid paths, or select a path for fast recovery from among the valid paths.

The first function block may further include a relay block configured to perform maintenance of a path and data forwarding through a relay path.

The first function block may further include a security management block configured to perform mutual authentication for a direct communication and a multicast key management for a group communication.

According to another embodiment of the present invention, a base station of a wireless access system is provided. The base station includes a first function block configured to perform radio resource control and management as a MAC layer and to reside on a control plane, and a second function block configured to perform medium access control as the MAC layer and to reside on the control plane and a data plane. The first function block includes a multi-mode management block configured to control the base station to perform a role of a relay station, a multicast management block configured to perform a group communication through a multicast group including a plurality of mobile stations, and a standalone management block configured to form an independent network or maintain connectivity to a station through a radio link with other base station having backbone connectivity when backbone connection is loss.

The multi-mode management block may includes a multi-mode configuration and control management block configured to perform configuration and control for changing a role of the base station, a connection maintenance management block configured to maintain or change a current service, and a link measurement and report management block configured to measure radio link quality of the base station and to report the radio link quality to other station.

The multicast management block may includes a multicast group predetermined management block configured to manage establishment, change or delete of a multicast communication in the multicast group, a multicast session management block configured to manage registration or deregistration of a multicast service, or start, change or termination of a multicast session, a multicast key management block configured to manage a multicast key for reliable multicast transmission, and a multicast control management block configured to perform multicast scheduling for transmission or reception of the multicast traffic.

The standalone management block may includes a standalone control management block configured to perform control and configuration function for maintaining a connection on loss of backbone connection, a standalone maintenance management block configured to manage a path to maintain or change standalone, or obtain or forward topology information of a serving cell or a neighbor cell, and a standalone data transmission management block configured to transmit data for communicating with a mobile station or transmit or receive data to or from an upper network via other base station, under standalone network.

The first function block may further include a path management block configured to manage a path for single point of failure (SPOF) immunity.

The path management block may includes a path configuration management block configured to manage configuration for performing a path discovery, a path establishment, a path selection, a path maintenance, or a path recovery, a path control management block configured to perform a function for controlling a path, a path discovery management block configured to perform a neighbor discovery or a path discovery, a path maintenance management block configured to manage path establishment, path delete, or path re-establishment, and a path selection management block configured to set an optimum path from among a plurality of valid paths, or select a path for fast recovery from among the valid paths.

The first function block may further include a relay block configured to perform maintenance of a path and data forwarding through a relay path.

The first function block may further include a security management block configured to perform mutual authentication for loss of backbone connection or SPOF immunity and to perform a multicast key management for a group communication.

According to yet another embodiment of the present invention, a relay station of a wireless access system is provided. The relay station includes a first function block configured to perform radio resource control and management as a MAC layer and to reside on a control plane, and a second function block configured to perform medium access control as the MAC layer and to reside on the control plane and a data plane. The first function block includes a multi-mode management block configured to control the relay station to perform a role of a base station, and a multicast management block configured to perform a group communication through a multicast group including a plurality of mobile stations.

The multi-mode management block may includes a multi-mode configuration and control management block configured to perform configuration and control for changing a role of the relay station, a connection maintenance management block configured to maintain or change a current service, and a link measurement and report management block configured to measure radio link quality of the relay station and to report the radio link quality to other station.

The first function block may further include a path management block configured to manage a path for single point of failure (SPOF) immunity.

The first function block may further include a relay block configured to perform maintenance of a path and data forwarding through a relay path.

Advantageous Effects

According to embodiments of the present invention, a wireless access system with high reliability can be provided.

MODE FOR INVENTION

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Now, various embodiments of the present inventions are described by way of an example of a network (hereinafter referred to as "HR-Network) for supporting high reliability (HR) to IEEE standard 802.16 and IEEE standard 802.16m. IEEE standard 802.16 is a standard for air interface for broadband wireless access systems, and IEEE standard 802.16m is a standard advanced air interface and is an amendment to IEEE standard 802.16, In this case, a station in a mobile service supported by IEEE standard 802.16 is defined as a mobile station (MS), an equipment set providing connectivity, management, and control of the MS is defined as a base station (BS), and an equipment set performing a relay role is defined as a relay station (RS). An MS, a BS and an RS meeting requirements of IEEE standard 802.16m are defined as an advanced MS (AMS), an advanced BS (ABS) and an advanced RS (ARS), respectively. An MS, a BS and an RS meeting requirements of HR-Network are defined as an HR-MS, an HR-BS and an HR-RS, respectively. The HR-MS, HR-BS or HR-RS is referred to as an HR-Network station (HR-station).

Figure 1:
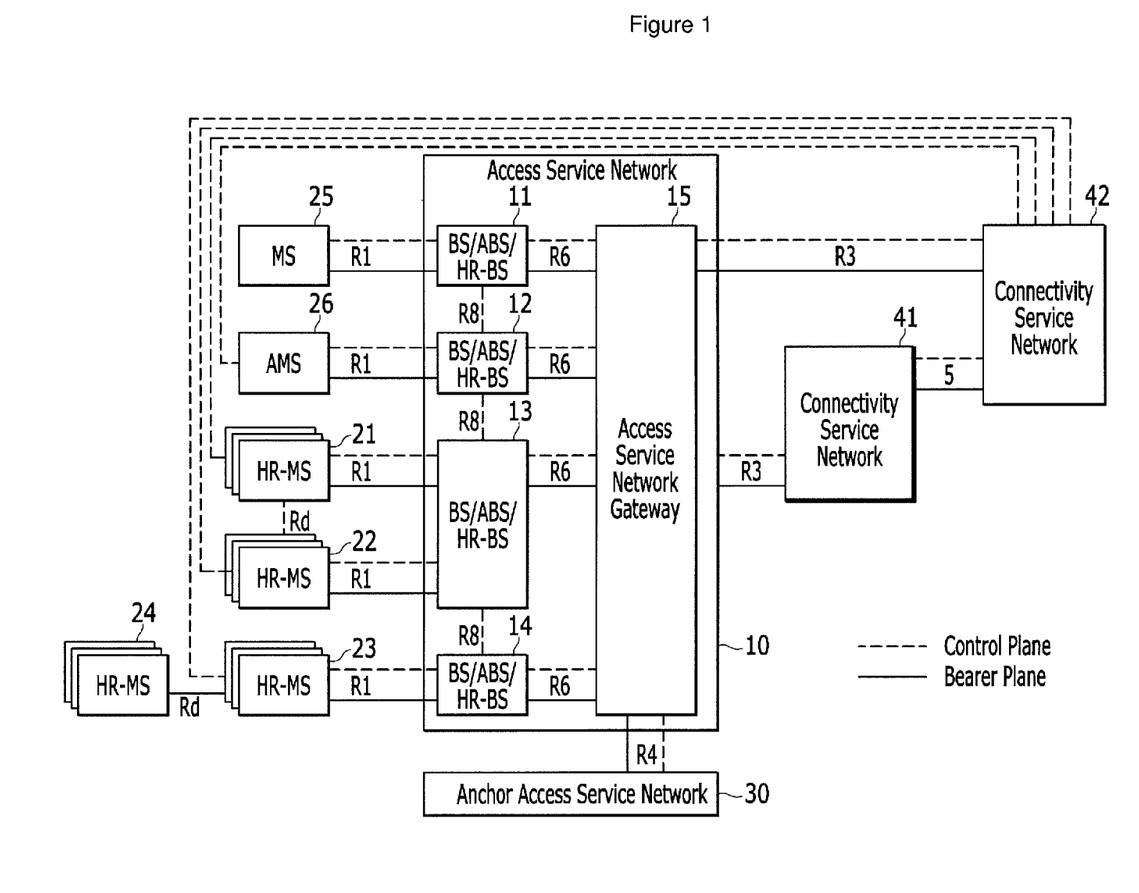
FIG. 1 shows network architecture of a wireless access system according to an embodiment of the present invention.

FIG. 1 shows network architecture of a wireless access system according to an embodiment of the present invention.

Referring to FIG. 1, a wireless access system 100 includes an access service network 10 and HR-MSs 21, 22, 23, and 24 connected to the access service network 10, and may further include an MS 25 and AMS 26 as wells as the HR-MSs 21, 22, 23, and 24.

The access service network 10 includes HR-BSs 11, 12, 13, and 14, and an access service network gateway 15. The HR-BS may perform a function of a BS or an ABS to support an MS or an AMS that is a mobile station operating in IEEE 802.16 or IEEE 802.16m access system. An air interface R1 exists between the BS, ABS or HR-BS 11, 12, 13, or 14, and the HR-MS 21, 22, or 23, the MS 25, or the AMS 26 that is subordinated to them. A connection Rd for a direct communication may exist between the HR-MS 21 or 23 and other HS-MS 22 or 24. A connection R8 exists between the BSs, ABSs or HR-BSs 11, 12, 13, and 14, and a connection R6 exists between the BS, ABS or HR-BS 11, 12, 13, or 14 and the access service network gateway 15. The BS, ABS or HR-BS 11, 12, 13, or 14 is connected to an outside network via the access service network gateway 15.

The outside network may include an anchor access service network 30 or a connectivity service network 41 or 42. A connection R4 exists between the anchor access service network 30 and the access service network gateway 15, and a connection R3 exists between the connectivity service network 41 or 42 and the access service network gateway 15. A connection R5 may exist between the connectivity service networks 41 and 42. The MSs, AMSs or HR-MSs 21-26 may be connected to the outside network by these connections (R2).

In FIG. 1, a connection denoted as a dotted line represents a connection at a control plane, and a connection denoted as a solid line represents a connection at a bearer plane.

Next, a protocol structure of a wireless access system according to an embodiment of the present invention is described with reference to FIG. 2 to FIG. 5.

Figure 2:
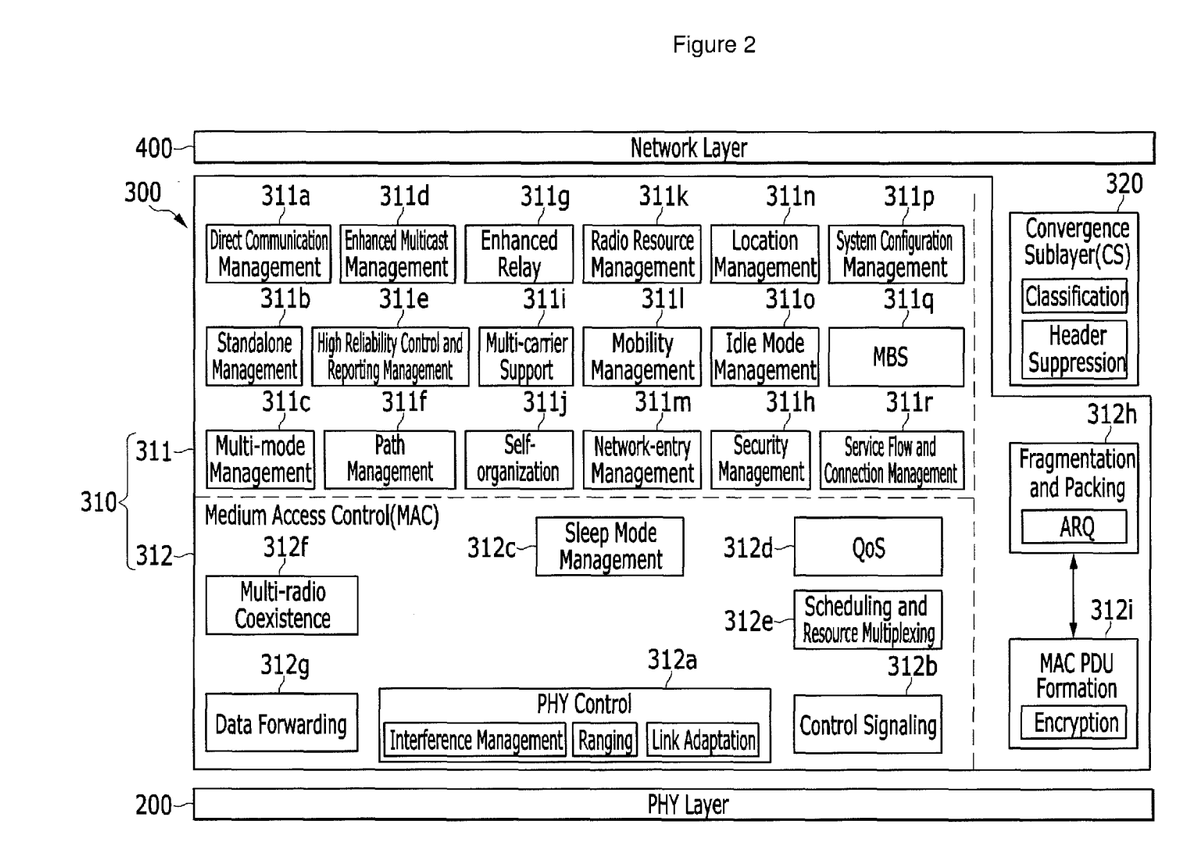
FIG. 2 shows a protocol structure of a wireless access system according to an embodiment of the present invention.
Figure 3:
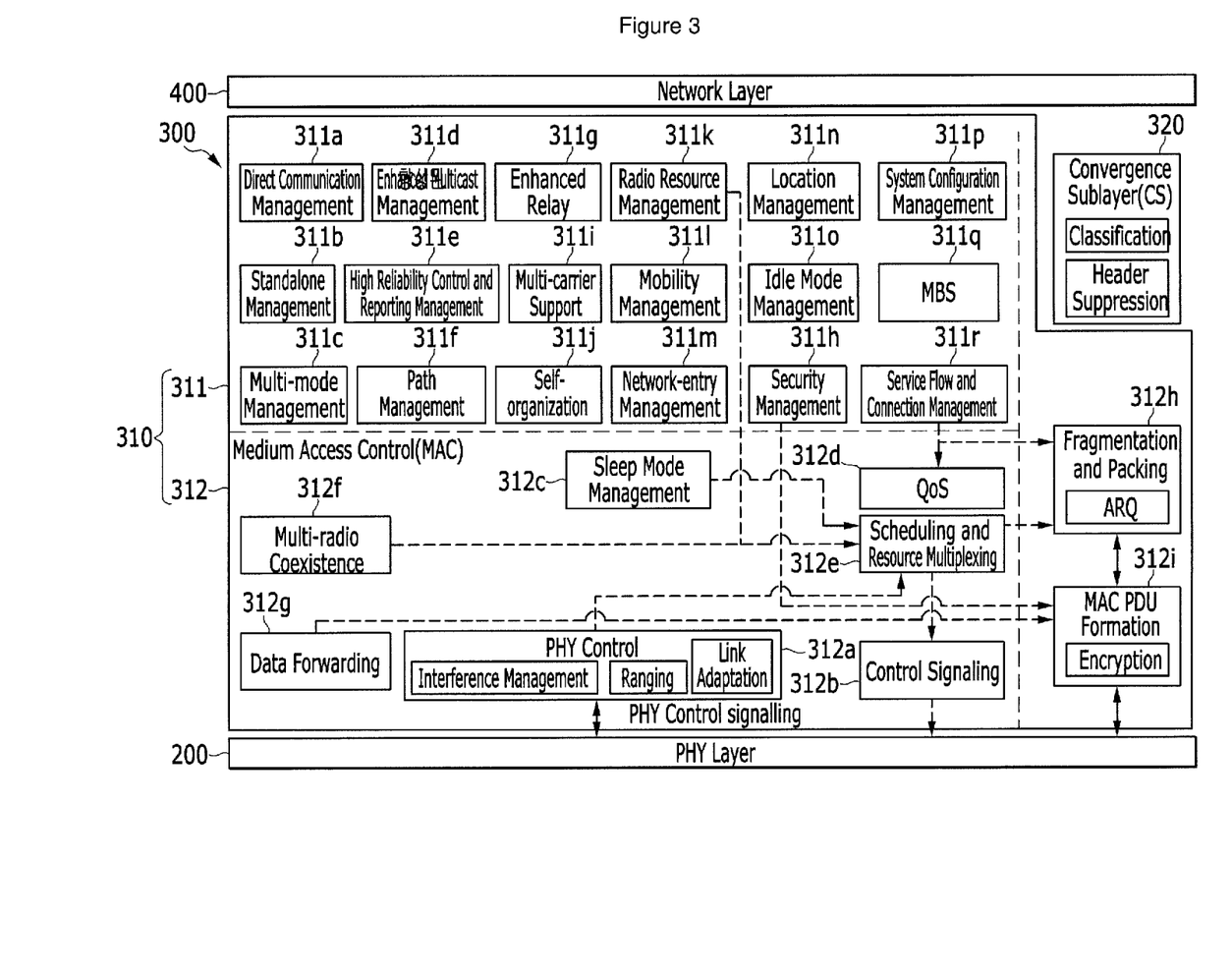
FIG. 3 shows a data plane processing flow in a protocol structure of a wireless access system according to an embodiment of the present invention.
Figure 4:
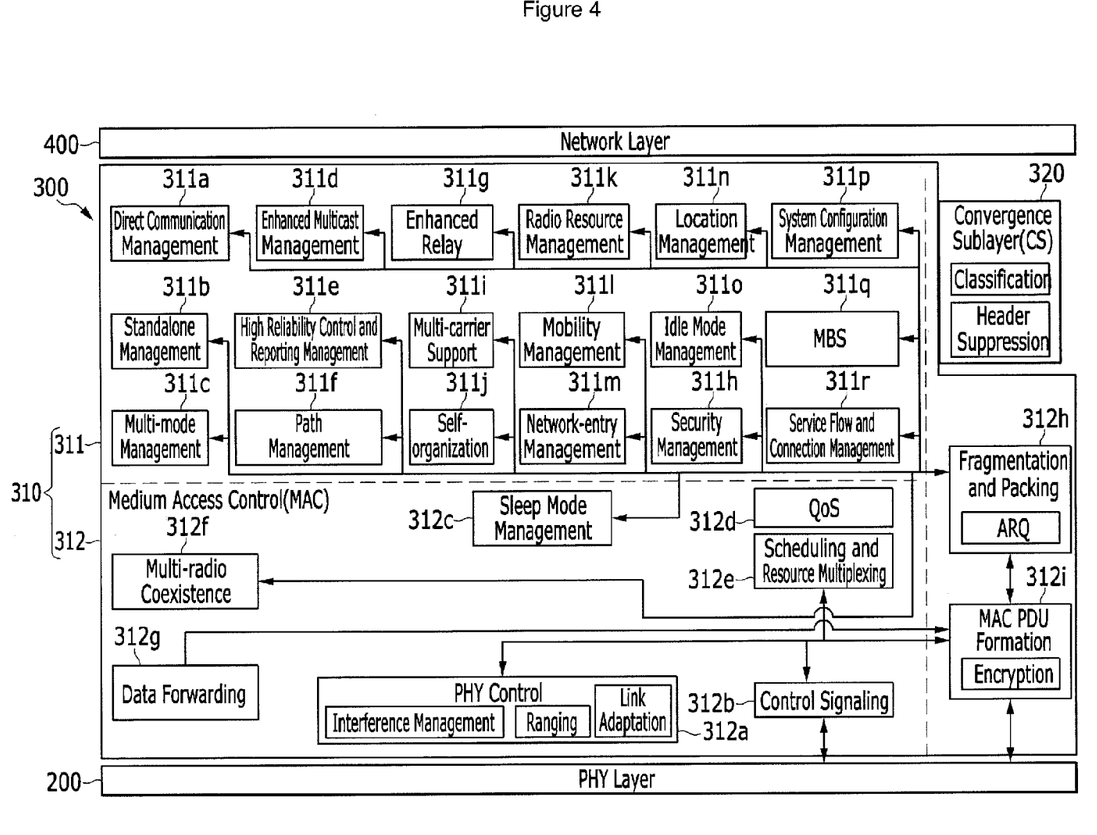
FIG. 4 shows a control plane processing flow in a protocol structure of a wireless access system according to an embodiment of the present invention.
Figure 5:
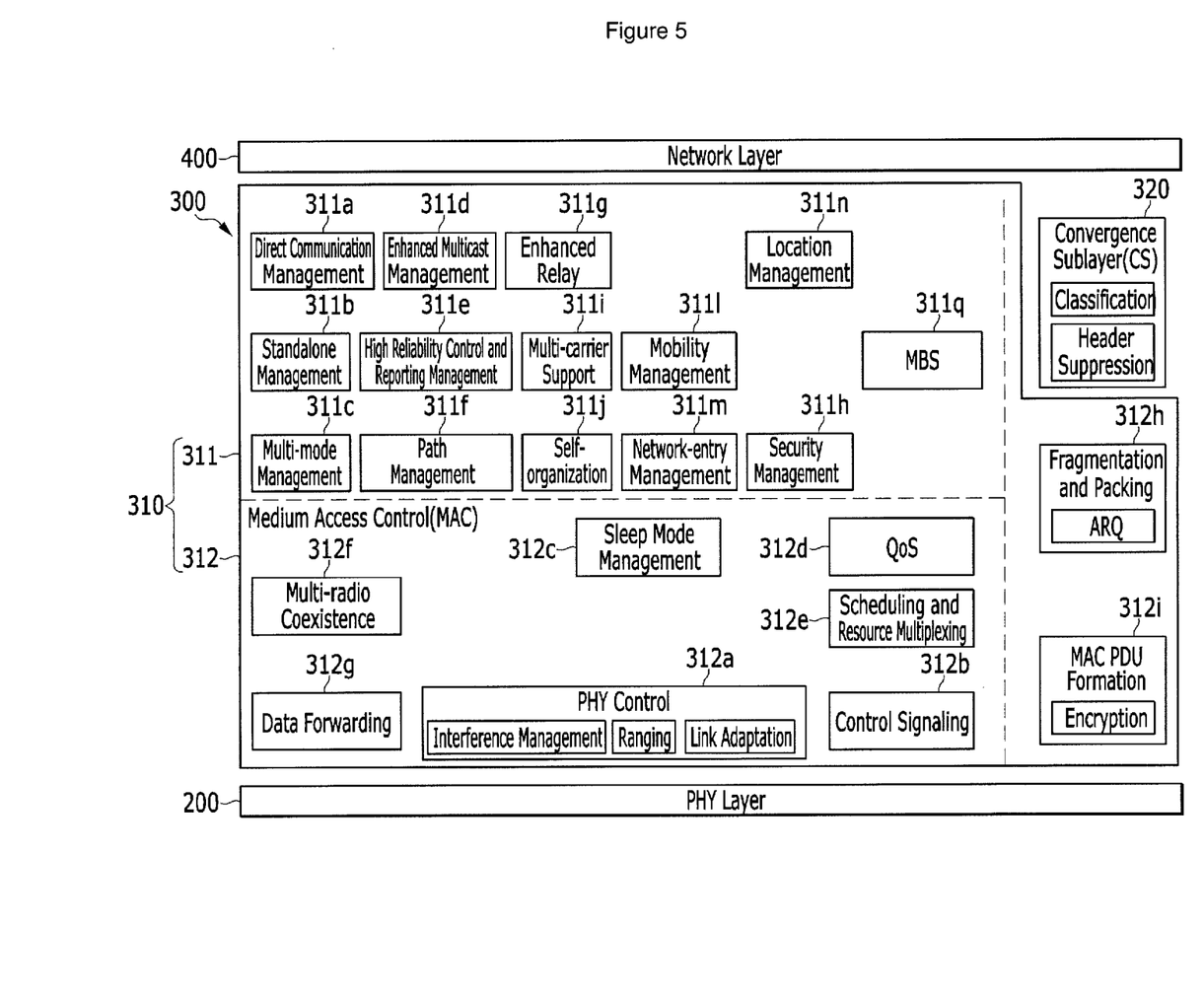
FIG. 5 shows a protocol structure of an HR-MS in a wireless access system according to an embodiment of the present invention.

FIG. 2 shows a protocol structure of a wireless access system according to an embodiment of the present invention, FIG. 3 shows a data plane processing flow in a protocol structure of a wireless access system according to an embodiment of the present invention, FIG. 4 shows a control plane processing flow in a protocol structure of a wireless access system according to an embodiment of the present invention, and FIG. 5 shows a protocol structure of an HR-MS in a wireless access system according to an embodiment of the present invention.

Referring to FIG. 2, a protocol of a wireless access system includes a physical (PHY) layer 200, a medium access control (MAC) layer 300, and a network layer 400. The MAC layer 300 includes common part sublayer (CPS) 310 and a convergence sublayer (CS) 320.

The CPS 310 is classified into a radio resource control and management (RRCM) function block 311 and an MAC function block 312. The RRCM function block 311 resides on a control plane, and the MAC function block 312 resides on the control plane and a data plane.

The RRCM function block 311 includes several functional blocks to support a backward compatibility with a conventional system and a high reliability. The function blocks includes at least some blocks of a direct communication management block 311a, a standalone management block 311b, a multi-mode management block 311c, an enhanced multicast management block 311d, a high reliability control and reporting management block 311e, path management block 311f, an enhanced relay block 311g, and a security management block 311h, according to a type of an HR-station.

The function blocks of the RRCM function block 311 may further include a multi-carrier support block 311i, a self-organization block 311j, a radio resource management block 311k, a mobility management block 311i, a network-entry management block 311m, a location management block 311n, an idle mode management block 311o, a system configuration management block 311p, a multicast broadcast service (MBS) block 311q, and a service flow and connection management block 311r, according to the type of the HR-station.

The direct communication management block 311a performs a function for supporting a direction communication between an HR-MS and other HR-MS in the absence of an HR-BS and an HR-RS. The direction communication may be performed through a single hop or a multi-hop. The direct communication management block 311a may be formed only in the HR-MS. The standalone management block 311b performs a function for configuring an independent network within the coverage of the HR-BS in a local area or for seamlessly maintaining connectivity to the HR-station through a radio link with the other HR-BS having backbone connectivity when the HR-BS loses the backbone connection. The standalone management block 311b may be formed in the HR-BS or other HR-station performing a role of the HR-BS. The multi-mode management block 311c performs a function for temporarily or persistently changing the HR-station's own role to other HR-station's role to perform the other HR-station's role. In other words, the multi-mode management block 311c can allow the HR-BS to perform a function of a relay station or the HR-MS to perform the function of the relay station or a function of a base station.

The enhanced multicast management block 311d performs a multicast communication such a group communication through a multicast group. The high reliability control and reporting management block 311e performs a function for controlling or reporting traffics that are less sensitive to a delay but should support the high reliability. The path management block 311f performs a function for managing (establishing, recovering, or releasing) a path for SPOF immunity or the direction communication. The path management block 311f may manage a path between HR-MSs, a path between an HR-RS and an HR-BS, and a path between an HR-MS and an HR-BS or HR-RS. The enhanced relay block 311g performs maintenance of a path or data forwarding through a relay path between HR-stations, for the SPOF immunity or the direction communication.

The security management block 311h performs secure key management and authentication/authorization, and traffic encryption/decryption and authentication using an encryption key. The security management block 311m may perform mutual authentication for or the direct communication, when the connectivity of backbone is loss or for the single point of failure (SPOF) immunity, and multicast key management for the group communication The mutual authentication may be performed with assistance of a network or be restrictedly performed in a cell or a limited area.

The multi-carrier support block 311i performs a function for supporting a multi-carrier environment, and the self-organization block 311j performs a function of self-organization or self-optimization. The radio resource management block 311k adjusts radio network parameters based on the traffic load, and includes functions of load control (load balancing), admission control, and interference control. The mobility management block 311i controls a mobility of the HR-station, and the network-entry management block 311m controls a network entry of the HR-MS. The location management block 311n provides a location based service (LBS), and the idle mode management block 311o is in charge of an idle mode support and control of the HR-station. The system configuration management block 311p manages system configuration information and transmits the system configuration information to the HR-station. The MBS block 311q is in charge of multicasting and/or broadcasting service in downlink. The service flow and connection management block 311r allocates a connection identifier (connection ID) or a service flow during access/handover service.

The control plane part of the MAC function block 312 includes function blocks. The function blocks includes at least some blocks of a PHY control block 312a, a control signaling block 312b, a sleep mode management block 312c, a quality of service (QoS) block 312d, a scheduling and resource multiplexing block 312e, a multi-radio coexistence block 312f, and data forwarding block 312g.

The PHY control block 312a handles PHY signaling, and may include an interference management block and a link adaptation block. The link adaptation block may perform a channel quality indicator (CQI), a hybrid automatic retransmit request (HARQ), and a power control. The control signaling block 312b generates a resource allocation message. The sleep mode management block 312c handles a sleep mode operation, and the QoS block 312d handles a QoS management based on QoS parameters. The scheduling and resource multiplexing block 312e schedules and multiplexes packets based on properties of connections, and the data forwarding block 312g performs a data forwarding function when the HR station is present on a path between the HR-BS and the HR-MS. The multi-radio coexistence block 312f controls or sets available spectrums of the HR-station in a radio environment where at least one of licensed, unlicensed, lightly-licensed spectrums coexists. The multi-radio coexistence block 312f may select and operate only one of the available spectrums, or simultaneously select and operate a plurality of spectrums.

The data plane part of the MAC function block 312 includes function blocks. The function block includes at least one block of a fragmentation and packing block 312h and an MAC packet data unit (PDU) formation block 312i.

The fragmentation and packing block 312h performs fragmenting or packing service data units (SDUs) based on scheduling results from the scheduling and resource multiplexing block 312e, and includes an automatic repeat request (ARQ) function. The MAC PDU formation block 312i constructs MAC control data unit (PDU) so that the HR-station can transmit a user packet or a management message into PHY layer 200, and may perform an encryption.

The CS 320 performs packet classification and header suppression.

Each function block shown in FIG. 2 may be embodied by hardware, software or a combination of the hardware and software, and several function blocks may be integrated into one function block. Some of the function blocks shown in FIG. 2 may be omitted according to a function of the wireless access system.

Next, referring to FIG. 3, a user traffic in the HR-MS or the HR-BS is transmitted from the PHY layer 200 to the network layer 400 via the data plane of the CPS 310 (i.e., the MAC PDU formation block 312i and the fragmentation and packing block 312h) and the CS 320, and vice versa. On a transmit side, a network layer packet by the CS 320, the fragmentation and packing block 312h, and the MAC PDU formation block 312i to form the MAC PDU to be sent to the PHY layer. On a receiver side, a physical layer SDU is processed by the MAC PDU formation block 312i, the fragmentation and packing block 312h, and the CS 320 to form the network layer packet. As shown by a dotted line arrow in FIG. 3, a control primitive that is related to the processing of the user traffic may be transmitted among the function blocks of the CPS 310 and between the CPS 310 and the PHY layer 200.

Referring to FIG. 4, on the transmit side, control plane signaling at the HR-BS or the HR-MS is transmitted from the control plane function blocks to the data plane function blocks, and is process by the data plane function blocks to form MAC signaling (for example, a MAC control message, a MAC header) to be transmitted to air interface. On the receiver side, the MAC signaling received through the air interface is processed by the data plane function blocks, and the control plane function blocks receive the processed control plane signaling.

Next, referring to FIG. 5, a protocol of the HR-RS has a structure where some functions are omitted from the protocol structure of the HR-MS or HR-BS shown in FIG. 2. For example, functions blocks such as the CS 320, the radio resource management block 311a, the idle mode management block 311e, the system configuration management block 311g, and the service flow and connection management block 311i are omitted from the protocol structure shown in FIG. 2 to form the protocol structure of the HR-RS.

Next, connections when the relay function exists in a wireless access system according to an embodiment of the present invention are described with reference to FIG. 6.

Figure 6:
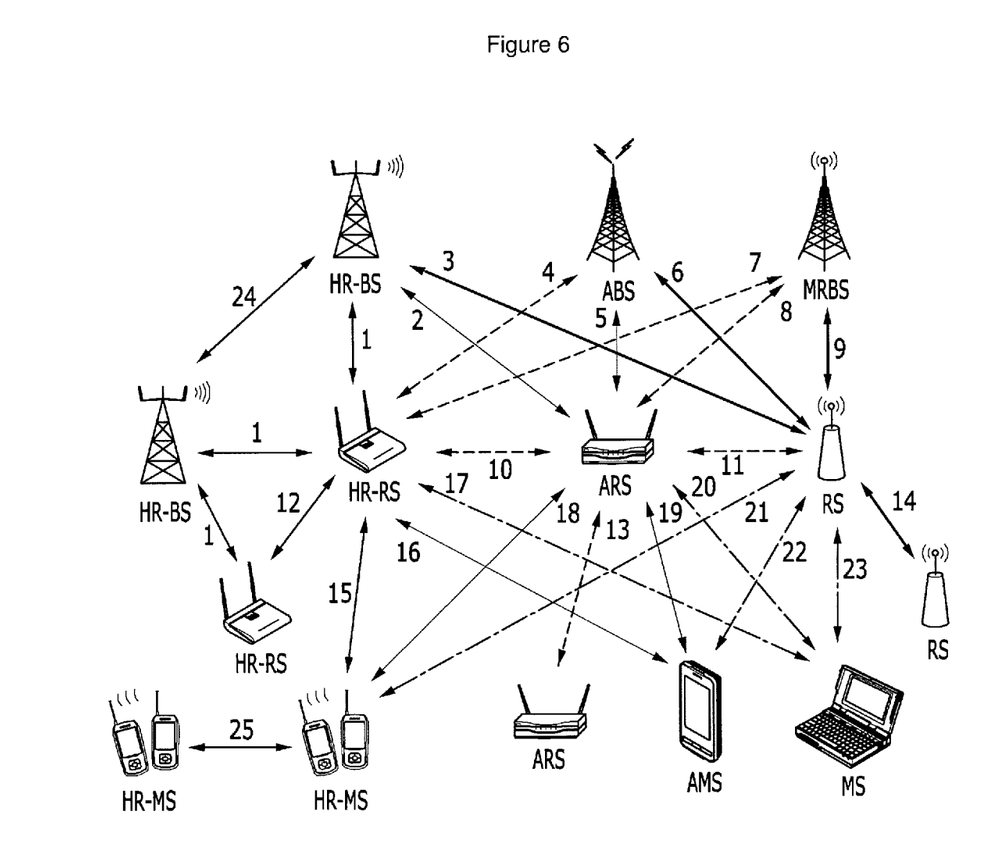
FIG. 6 shows relay related connections in a wireless access system according to an embodiment of the present invention.

FIG. 6 shows relay related connections in a wireless access system according to an embodiment of the present invention. It is assumed in FIG. 6 that a BS (hereinafter referred to as "MRBS") meeting requirements of IEEE 802.16j which is an amendment to IEEE 802.16 and is a standard for a multi-hop relay (MR) additionally exists as well as the BS, the ABS, and the HR-BS.

Referring to FIG. 6, the HR-MS, AMS or MS may be directly connected to the HR-BS, ABS or MRBS, or may be connected to the HR-BS, ABS or MRBS via at least one HR-RS, ARS or RS. At least one HR-BS or HR-RS which is subordinated to one HR-BS may exist, and one HR-MS may be connected to the other HR-MS. Support of each connection and a used protocol may be shown as Table 1. The MS and the HR-RS, ARS or RS may be connected by IEEE 802.16 air interface (an arrow denoted by an one-point chain line in FIG. 6), the RS and the HR-BS may be connected by IEEE 802.16j air interface (an arrow denoted by a bold solid line in FIG. 6), and the ARS and the HR-BS may be connected by IEEE 802.16m air interface (an arrow denoted by a fine solid line in FIG. 6). An arrow by a dotted line in FIG. 6 represents a case that air interface is not supported.

TABLE 1

| Connection # | Connected entities | Protocol used | Supported (Y/N) |
|---|---|---|---|
| 1 | HR-BS to HR-RS | IEEE 802.16n | Y |
| 2 | HR-BS to ARS | IEEE 802.16n | Y |
| 3 | HR-BS to RS | IEEE 802.16n | Y |
| 4 | ABS to HR-RS | N/A | N |
| 5 | ABS to ARS | IEEE 802.16m | Y |
| 6 | ABS to RS | IEEE 802.16j | Y |
| 7 | MRBS to HR-RS | N/A | N |
| 8 | MRBS to ARS | N/A | N |
| 9 | MRBS to RS | IEEE 802.16j | Y |
| 10 | HR-RS to ARS | N/A | N |
| 11 | ARS to RS | N/A | N |
| 12 | HR-RS to HR-RS | IEEE 802.16n | Y |
| 13 | ARS to ARS | N/A | N |
| 14 | RS to RS | IEEE 802.16j | Y |
| 15 | HR-RS to HR-MS | IEEE 802.16n | Y |
| 16 | HR-RS to AMS | IEEE 802.16m | Y |
| 17 | HR-RS to MS | IEEE 802.16 | Y |
| 18 | ARS to HR-MS | IEEE 802.16m | Y |
| 19 | ARS to AMS | IEEE 802.16m | Y |
| 20 | ARS to MS | IEEE 802.16 | Y |
| 21 | RS to HR-MS | IEEE 802.16 | Y |
| 22 | RS to AMS | IEEE 802.16 | Y |
| 23 | RS to MS | IEEE 802.16 | Y |
| 24 | HR-BS to HR-BS | IEEE 802.16n | Y |
| 25 | HR-MS to HR-MS | IEEE 802.16n | Y |

Next, function blocks for supporting the high reliability in a protocol structure of a wireless access system according to an embodiment of the present invention are described with reference to FIG. 7 to FIG. 15.

Figure 7:
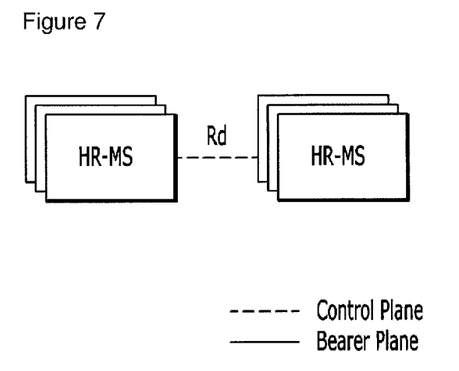
FIG. 7 shows a network model for a direct communication according to an embodiment of the present invention.
Figure 8:
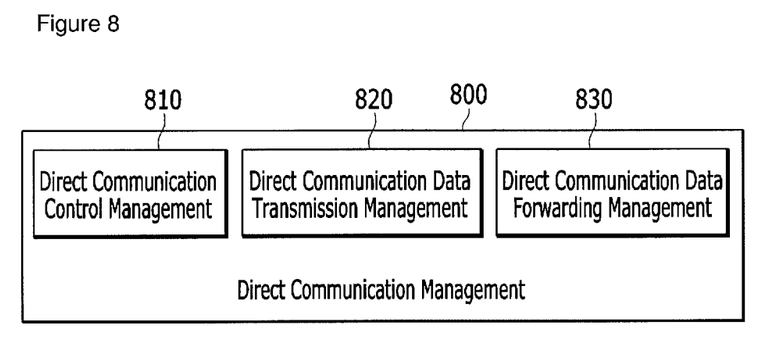
FIG. 8 shows a direct communication management block according to an embodiment of the present invention.

FIG. 7 shows a network model for a direct communication according to an embodiment of the present invention, and FIG. 8 shows a direct communication management block according to an embodiment of the present invention.

Referring to FIG. 7, an HR-MS and another HR-MS performs a direct communication through a control plane connection Rd. A direct communication management block manages the direct communication in a protocol structure.

Referring to FIG. 8, a direct communication management block 800 includes a direct communication control management block 810, direct communication data transmission management block 820, and a direct communication data forwarding management block 830.

The direct communication control management block 810 controls a PHY frame to manage (initiate, maintain, change or delete) direct communication traffic transmission between HR-MSs. The direct communication control management block 810 performs direct communication scheduling and logical-to-physical channel mapping for transmitting or receiving the direct communication traffic. The direct communication data transmission block 820 performs a single-hop or multi-hop direct communication traffic transmission between the HR-MSs. The direct communication data forwarding block 830 performs a function for forwarding data that is received by the direct communication to an HR-station that does not perform the direct communication, during the direct communication between the HR-MSs. The data may be transmitted to an upper network or be local-forwarded without being transmitted to the upper network.

Figure 9:
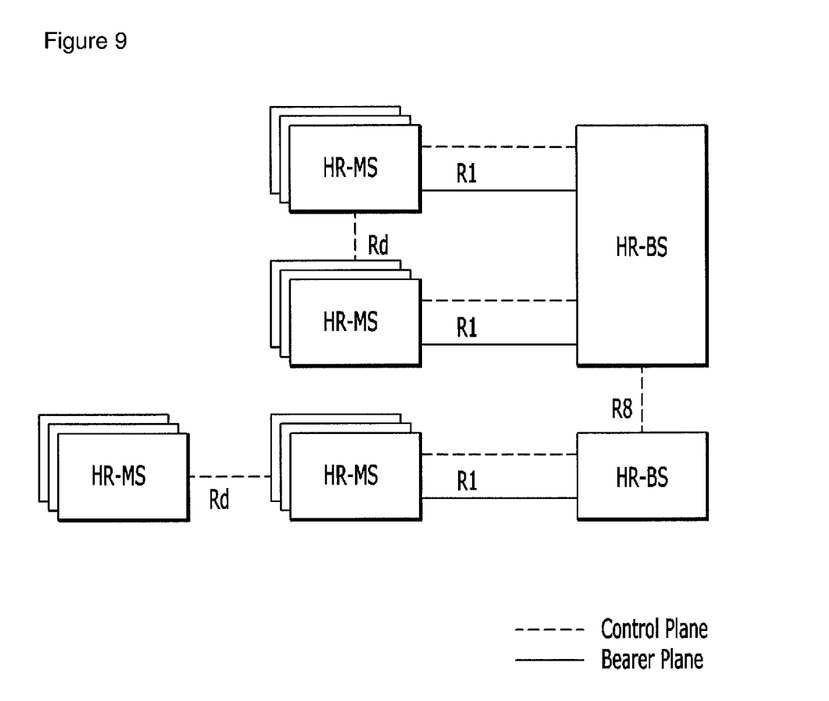
FIG. 9 shows a standalone network model according to an embodiment of the present invention.
Figure 10:
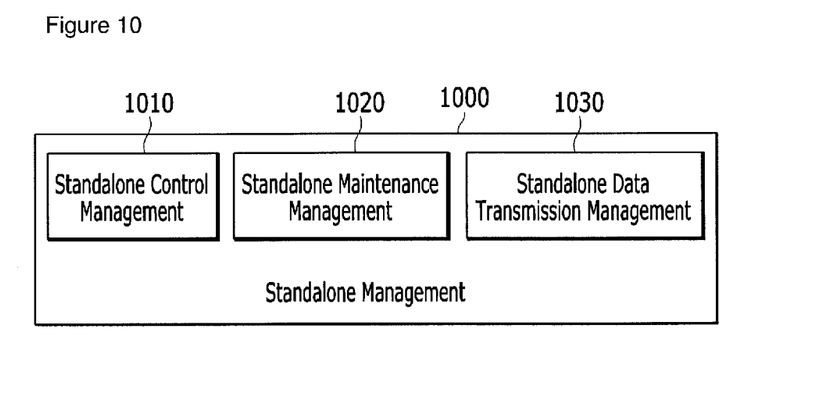
FIG. 10 shows a standalone management block according to an embodiment of the present invention.

FIG. 9 shows a standalone network model according to an embodiment of the present invention, and FIG. 10 shows a standalone management block according to an embodiment of the present invention.

Referring to FIG. 9, a standalone network may be formed by a standalone management block when the HR-BS's backbone connectivity is loss. A control plane connection R8 exits through a radio link not the backbone between HR-BSs. A control plane and bearer plane connection R1 exists between the HR-BS and the HR-MS, and a control plane connection for a direct communication may exist between the HR-MSs. The control plane connection may be Rd air interface performed by the direct communication management block or another air interface such as a wireless local area network (WLAN) or Bluetooth.

Referring to FIG. 10, a standalone management block 1000 includes a standalone control management block 1010, a standalone maintenance management block 1020, and standalone data transmission management block 1030.

The standalone control management block 1010 performs control and configuration function for seamlessly maintaining a connection on the loss of backbone connectivity. The standalone maintenance management block 1020 performs a function for managing (establishing, maintaining, changing or deleting) a path to maintain or change the standalone, or a function for obtaining or forwarding topology information of a serving cell or a neighbor cell. The standalone data transmission management block 1030 performs a function for transmitting data for communicating with the HR-MS or transmitting or receiving data to or from the upper network via other HR-BS, under the standalone network.

Figure 11:
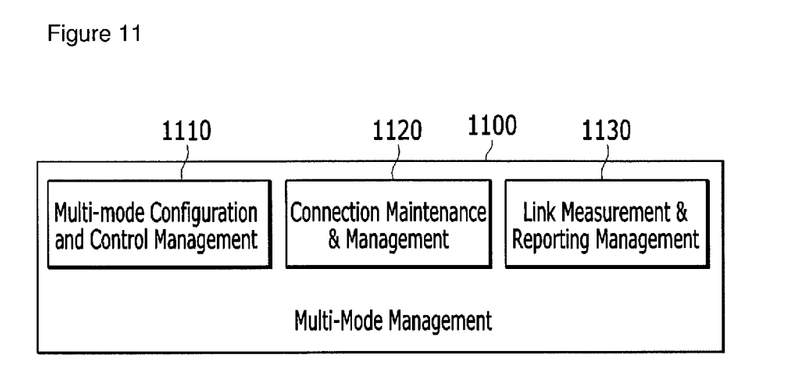
FIG. 11 shows a multi-mode management block according to an embodiment of the present invention.

FIG. 11 shows a multi-mode management block according to an embodiment of the present invention.

Referring to FIG. 11, a multi-mode management block 1100 includes a multi-mode configuration and control management block 1110, a connection maintenance management block 1120 and a link measurement and report management block 1130.

The multi-mode configuration and control management block 1110 performs configuration and control for changing a role of an HR-station when the HR-station such as the HR-BS or the HR-RS does not perform its role or a radio link is loss or changed. The multi-mode configuration and control management block 1110 may incorporate or divide network processes, or start, change or terminate the network processes, for configuration and control of the role change. The connection maintenance management block 1120 maintains or changes a current service, or manages subordinated HR-MS. The connection maintenance management block 1120 may maintain or change the current service under the standalone network environment or the direct communication environment, or control a path establishment with other HR-BS to maintain a connection to the upper network. The connection maintenance management block 1120 may manage group handover, group network entry or reentry, callback handover, connection configuration control according to a priority of subordinated HR-MS. The link measurement and report management block 1130 measures radio link quality between HR-stations, and reports the radio link quality to other HR-station. In order to configure or reconfigure the network for the role change, the link measurement and report management block 1130 exchanges information on channel quality or topology between HR-BSs to maintain or change the multi-mode.

Figure 12:
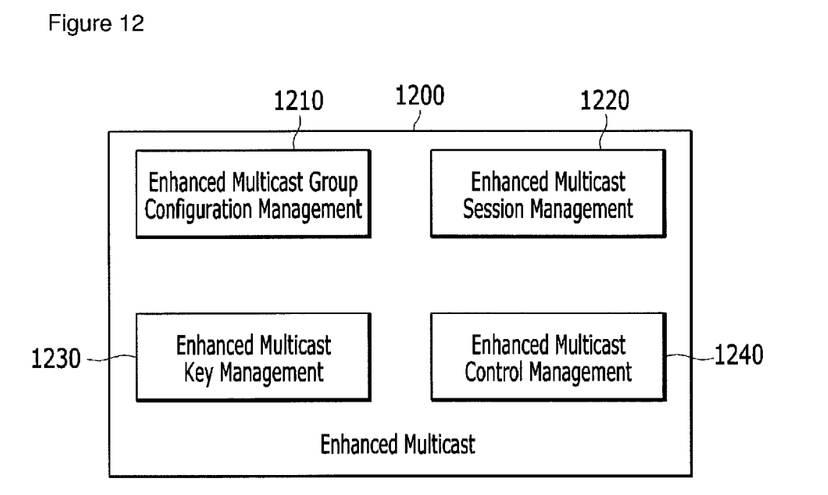
FIG. 12 shows an enhanced multicast block according to an embodiment of the present invention.

FIG. 12 shows an enhanced multicast block according to an embodiment of the present invention.

Referring to FIG. 12, an enhanced multicast block 1200 includes nm enhanced multicast group configuration management block 1210, an enhanced multicast session management block 1220, an enhanced multicast key management block 1230, and an enhanced multicast control management block 1240.

The enhanced multicast group configuration management block 1210 manages establishment, change or delete of a multicast communication within multicast group. An HR-station may belong to one or more multicast groups. The enhanced multicast session management block 1220 manages start, change or termination of a multicast session regardless of registration or deregistration of a multicast service or a state of a terminal The enhanced multicast key management block 1230 provides a secure transmission using a multicast key, for reliable multicast transmission of the multicast group supporting the SPOF immunity and the direct communication. The enhanced multicast control management block 1240 performs multicast for transmission or reception of the multicast traffic, and may perform logical-to-physical channel mapping.

Figure 13:
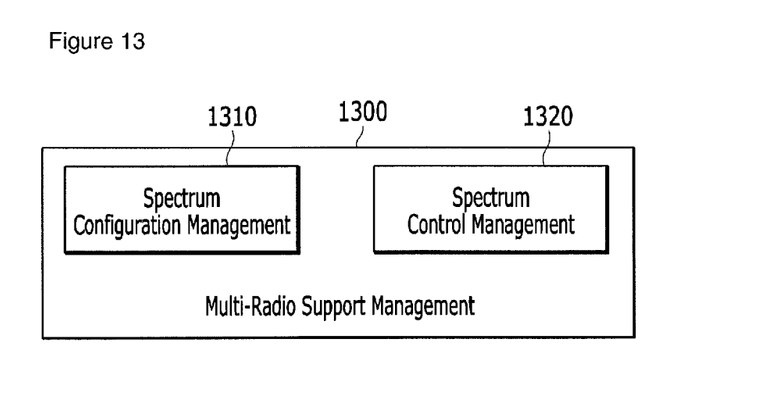
FIG. 13 shows a multi-radio coexistence block according to an embodiment of the present invention.

FIG. 13 shows a multi-radio coexistence block according to an embodiment of the present invention.

Referring to FIG. 13, a multi-radio coexistence block 1300 includes a spectrum configuration management block 1310 and a spectrum control management block 1320.

The spectrum configuration management block 1310 controls an operation of an unlicensed spectrum, a lightly-licensed spectrum or a licensed spectrum, or configures or controls an available spectrum. The spectrum configuration management block 1310 may simultaneously operate at least one spectrum. The spectrum control management block 1320 controls the spectrums to allow the communication using the air interface between the HR-stations. The spectrum control management block 1320 may sense, select, change, maintain or delete the spectrums.

Figure 14:
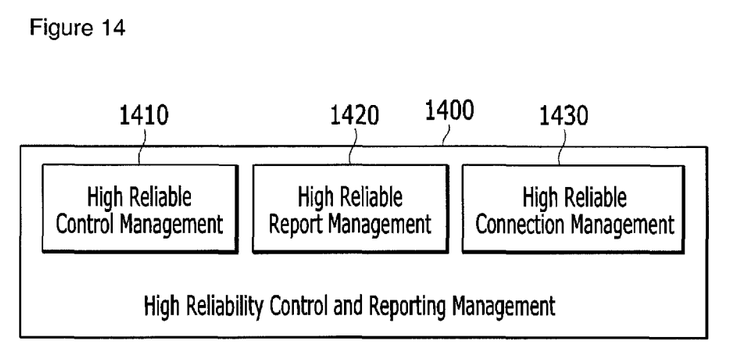
FIG. 14 shows a high reliability control and reporting management block according to an embodiment of the present invention.

FIG. 14 shows a high reliability control and reporting management block according to an embodiment of the present invention.

Referring to FIG. 14, a high reliability control and reporting management block 1400 a high reliable control management block 1410, high reliable report management block 1420, and a high reliable connection management block 1430.

The high reliable control management block 1410 controls the HR-station for the high reliability, to perform monitoring or sensing for an appropriate purpose. The high reliable report management block 1420 reports the monitoring or sensing result to other HR-station. The high reliable connection management block 1430 manages a registration or deregistration of a reliable service or a start, change or termination of a reliable connection.

Figure 15:
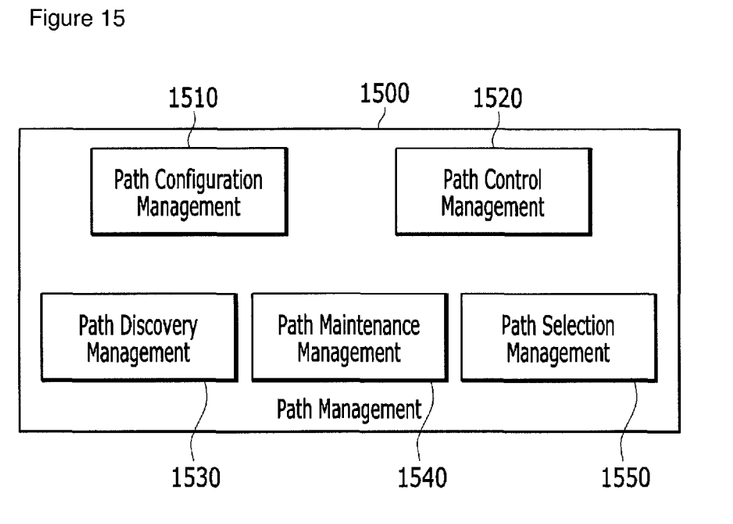
FIG. 15 shows a path management block according to an embodiment of the present invention.

FIG. 15 shows a path management block according to an embodiment of the present invention.

Referring to FIG. 15, a path management block 1500 includes a path configuration management block 1510, a path control management block 1520, a path discovery management block 1530, a path maintenance management block 1540, and a path selection management block 1550.

The path configuration management block 1510 manages configuration for performing functions such as a path discovery, a path establishment, a path selection, a path maintenance, and a path recovery. The path control management block 1520 performs a function for controlling a path between HR-stations, and the path discovery management block 1530 performs the path discovery or neighbor discovery periodically or when disruption occurs. The path maintenance management block 1540 manages path establishment, path delete and path re-establishment between the HR-stations. The path selection management block 1550 sets an optimum path from among a plurality of valid paths between the HR-stations, or selects a path for fast recovery from among the valid paths.

As described above, according to a protocol structure according to an embodiment of the present invention, a wireless access system with high reliability can be provided.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A mobile station of a wireless access system, comprising:
   a first function block configured to perform radio resource control and management as a medium access control (MAC) layer, and to reside on a control plane; and
   a second function block configured to perform medium access control as the MAC layer, and to reside on the control plane and a data plane,
   wherein the first function block comprises
   a direct communication management block configured to support a direct communication between the mobile station and other mobile station,
   a multi-mode management block configured to control the mobile station to perform a role of a relay station or a base station,
   a multicast management block configured to perform a group communication through a multicast group including the mobile station, and
   a path management block configured to manage a path for the direct communication,
   wherein the multi-mode management block comprises:
   a multi-mode configuration and control management block configured to perform configuration and control for a role of the mobile station;
   a connection maintenance management block configured to maintain or change a current service; and
   a link measurement and report management block configured to measure radio link quality of the mobile station, and to report the radio link quality to other station.

2. The mobile station of claim 1, wherein the direct communication management block comprises:
   a direct communication control management block configured to control a frame to manage direct communication traffic transmission between the mobile station and the other mobile station;
   a direct communication data transmission block configured to perform transmission of the direct communication traffic; and
   a direct communication data forwarding block configured to forward data to a station that does not perform the direct communication, during the direct communication.

3. The mobile station of claim 1, wherein the multicast management block comprises:
   a multicast group configuration management block configured to manage establishment, change or delete of a multicast communication in the multicast group;
   a multicast session management block configured to manage registration or deregistration of a multicast service, or start, change or termination of a multicast session; and
   a multicast key management block configured to manage a multicast key for reliable multicast transmission.

4. The mobile station of claim 1, wherein the path management block comprises:
   a path configuration management block configured to manage configuration for performing a path discovery, a path establishment, a path selection, a path maintenance, or a path recovery;
   a path control management block configured to perform a function for controlling a path;

a path discovery management block configured to perform a neighbor discovery or a path discovery;
a path maintenance management block configured to manage path establishment, path delete, or path re-establishment; and
a path selection management block configured to set an optimum path from among a plurality of valid paths, or select a path for fast recovery from among the valid paths.

5. The mobile station of claim 1, wherein the first function block further comprises a relay block configured to perform maintenance of a path and data forwarding through a relay path.

6. The mobile station of claim 1, wherein the first function block further comprises a security management block configured to perform mutual authentication for a direct communication and a multicast key management for a group communication.

7. A base station of a wireless access system, comprising:
a first function block configured to perform radio resource control and management as a medium access control (MAC) layer, and to reside on a control plane; and
a second function block configured to perform medium access control as the MAC layer, and to reside on the control plane and a data plane,
wherein the first function block comprises
a multi-mode management block configured to control the base station to perform a role of a relay station,
a multicast management block configured to perform a group communication through a multicast group including a plurality of mobile stations, and
a standalone management block configured to form an independent network or maintain connectivity to a station through a radio link with other base station having backbone connectivity when backbone connection is loss,
wherein the multi-mode management block comprises:
a multi-mode configuration and control management block configured to perform configuration and control for changing a role of the base station;
a connection maintenance management block configured to maintain or change a current service; and
a link measurement and report management block configured to measure radio link quality of the base station, and to report the radio link quality to other station.

8. The base station of claim 7, wherein the multicast management block comprises:
a multicast group predetermined management block configured to manage establishment, change or delete of a multicast communication in the multicast group;
a multicast session management block configured to manage registration or deregistration of a multicast service, or start, change or termination of a multicast session;
a multicast key management block configured to manage a multicast key for reliable multicast transmission; and
a multicast control management block configured to perform multicast scheduling for transmission or reception of the multicast traffic.

9. The base station of claim 7, wherein the standalone management block comprises:
a standalone control management block configured to perform control and configuration function for maintaining a connection on loss of backbone connection;
a standalone maintenance management block configured to manage a path to maintain or change standalone, or obtain or forward topology information of a serving cell or a neighbor cell; and
a standalone data transmission management block configured to transmit data for communicating with a mobile station or transmit or receive data to or from an upper network via other base station, under standalone network.

10. The base station of claim 7, wherein the first function block further comprises a path management block configured to manage a path for single point of failure (SPOF) immunity.

11. The base station of claim 10, wherein the path management block comprises:
a path configuration management block configured to manage configuration for performing a path discovery, a path establishment, a path selection, a path maintenance, or a path recovery;
a path control management block configured to perform a function for controlling a path;
a path discovery management block configured to perform a neighbor discovery or a path discovery;
a path maintenance management block configured to manage path establishment, path delete, or path re-establishment; and
a path selection management block configured to set an optimum path from among a plurality of valid paths, or select a path for fast recovery from among the valid paths.

12. The base station of claim 7, wherein the first function block further comprises a relay block configured to perform maintenance of a path and data forwarding through a relay path.

13. The base station of claim 7, wherein the first function block further comprises a security management block configured to perform mutual authentication for loss of backbone connection or single point of failure (SPOF) immunity, and to perform a multicast key management for a group communication.

14. A relay station of a wireless access system, comprising:
a first function block configured to perform radio resource control and management as a medium access control (MAC) layer, and to reside on a control plane; and
a second function block configured to perform medium access control as the MAC layer, and to reside on the control plane and a data plane,
wherein the first function block comprises
a multi-mode management block configured to control the relay station to perform a role of a base station, and
a multicast management block configured to perform a group communication through a multicast group including a plurality of mobile stations,
wherein the multi-mode management block comprises:
a multi-mode configuration and control management block configured to perform configuration and control for changing a role of the relay station;
a connection maintenance management block configured to maintain or change a current service; and
a link measurement and report management block configured to measure radio link quality of the relay station, and to report the radio link quality to other station.

15. The relay station of claim 14, wherein the first function block further comprises a path management block configured to manage a path for single point of failure (SPOF) immunity.

16. The relay station of claim 14, wherein the first function block further comprises a relay block configured to perform maintenance of a path and data forwarding through a relay path.

* * * * *